Dec. 3, 1968 R. L. GOWER 3,414,037
PLATFORM TYPE TRACTION STRUCTURE ASSEMBLY
Filed Nov. 13, 1967 2 Sheets-Sheet 1
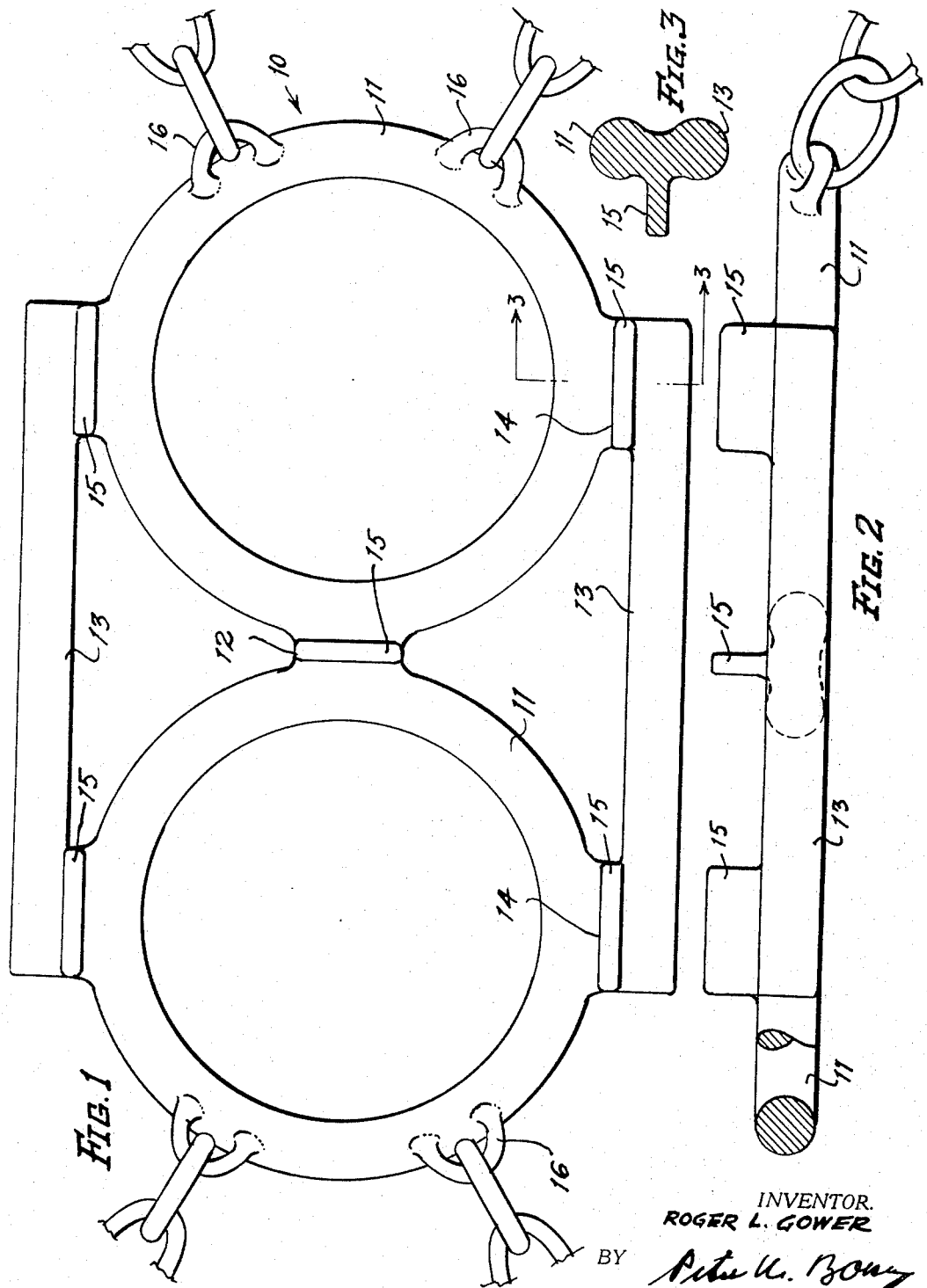
INVENTOR.
ROGER L. GOWER
BY Dec. 3, 1968    R. L. GOWER    3,414,037
PLATFORM TYPE TRACTION STRUCTURE ASSEMBLY
Filed Nov. 13, 1967    2 Sheets-Sheet 2

INVENTOR.
ROGER L. GOWER
BY

United States Patent Office 3,414,037
Patented Dec. 3, 1968

3,414,037
PLATFORM TYPE TRACTION STRUCTURE
ASSEMBLY
Roger L. Gower, P.O. Box 65, Canaan, Maine 04924
Filed Nov. 13, 1967, Ser. No. 682,186
3 Claims. (Cl. 152—229)

ABSTRACT OF THE DISCLOSURE

This invention relates to an improved platform type traction structure assembly. Said platforms consisting of a plurality of annular members disposed between parallel elongated members and having loops associated with said annular members adaptable for attaching said platform members to side chains.

---

This invention constitutes an improvement of my copending patent application, Ser. No. 579,071, filed Sept. 13, 1966.

The present invention relates to traction devices for motor-driven vehicles, and particularly for such vehicles as are used in moving heavy loads through snow, mud, sand or other difficult terrain.

Anti-skid devices such as have heretofore been manufactured have been provided in some cases with a longitudinal series of rings upon which there were welded or otherwise attached, at spaced intervals, multiple lugs, cleats, points, or other gripping members. However, these protrusions, which necessarily followed the contour of the rings in their mounting thereon, were placed in a modified diagonal direction when the assembly was mounted on a wheel, and this increased the skidding when the ring tipped, upon the application of unequal force.

The assembly of the present invention comprises a plurality of platform structures, each flexibly connected to side chains of the type used in conventional vehicle tire chains, each of such structures being cast in the form of a pair of parallel bars having disposed therebetween and integral therewith a plurality of annular members, each of said members being likewise integrally connected to the next adjacent member in said structure; and a plurality of projections, spaced apart and projecting in a direction transverse to the plane of the structure. Said projections may be disposed either at the points of juncture of the said annular members and the said parallel bars, or certain of said projections may be formed upon, and integral with, the said annular members in locations other than said points of juncture. However, it is deemed desirable to have one of said projections disposed at the juncture point between each two annular members.

Thus the danger of a sidewise or diagonal skidding action is eliminated, and the forward drive of the multiple protruding elements between the annular members and the bars is increased substantially over any traction device heretofore known. When gripping force is exerted by any of the projecting elements of the structure, the strength of the entire structure is joined with that gripping force.

The cross-bars of the present invention hold the annular members in rigid relationship to each other and to the bars, so that there is no independent suspension of any one of said members. Furthermore, the straight-line construction of the platform lessens the tendency for the structure to clog with mud or packed snow, because the unequal pressure of a pneumatic tire upon the entire width of the platform prevents the accumulation of such mud or snow.

It is the purpose of this invention to provide a gripping means assembly, having the nature of a series of platforms, each independently and flexibly connected to side chains for mounting in conventional fashion upon the wheels of a vehicle, so that the projecting elements will extend in a direction away from the wheel, to penetrate into the mud, snow, or other soft terrain as the wheel turns to move the vehicle, the thrust of the projecting elements serving to increase the traction of the wheel.

When full contact with the ground has been made by the projecting elements on one of such platforms, the lugs, or projections, on the leading edge of the next of said platforms in the assembly will be approaching contact with the ground, to provide continuing traction by the projecting elements of the successive platforms in the assembly.

Projects which have heretofore been used in an effort to increase traction have been only partially effective because they were either completely or partially flexible, and because their gripping members, as has been explained above, did not provide as much effective traction as was needed.

In the present invention, the platform is of rigid construction and the projecting elements thereon are so disposed as to coact with the pressure upon the tire and thus force all of the projecting elements on the said platform to act in unison, and to hold tightly in providing traction through soft or powdery terrain or upon slippery surfaces.

With the above and other objects in view, this invention consists of the novel features, combination and arrangement of parts, hereinafter fully described, claimed and illustrated in the accompanying drawings, forming a part of this application, in which similar characters of reference indicate corresponding parts in all views, and in which:

FIGURE 1 is a top plan view of a single platform structure of the present invention wherein the projecting elements are disposed at the points of juncture of the annular members and the parallel bars;

FIGURE 2 is similar to FIGURE 1, but has the projecting elements disposed at intermediate points upon the annular members;

FIGURE 3 is a side elevation of the structure shown in FIGURE 1;

Figure 4:
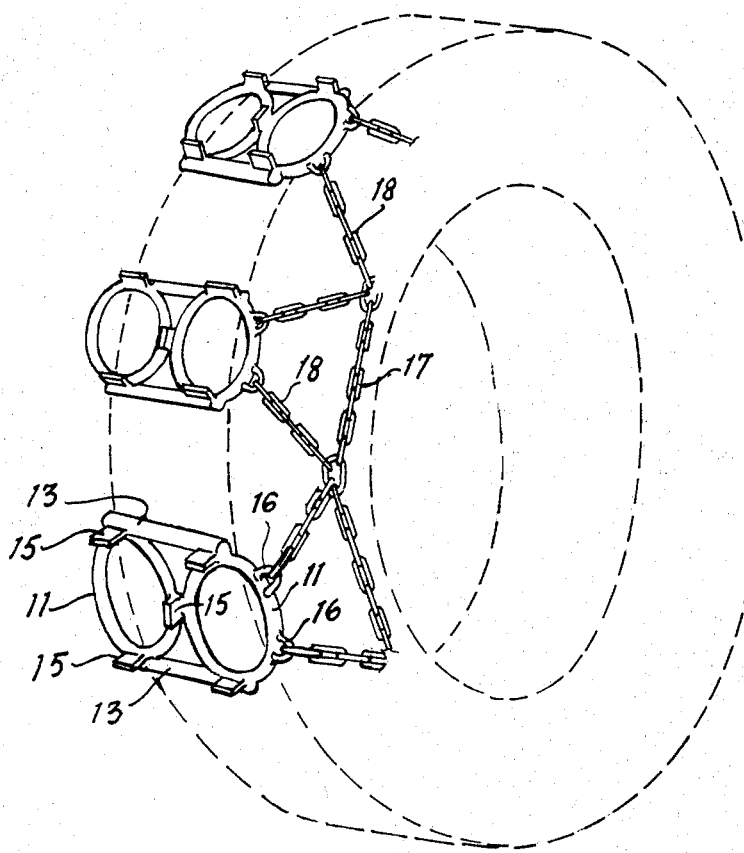
FIGURE 4 is a perspective view showing a series of such platform-type structures assembled together and mounted on a wheel.
Figure 6:
FIGURE 6 is a side elevation showing a loop formed upon and integral with an annular member to permit interconnecting links to be attached to said annular member.
Figure 5:
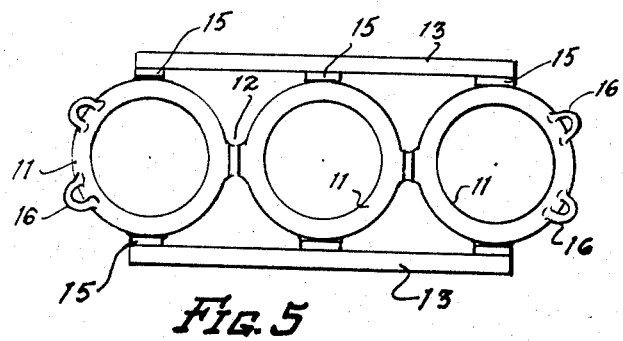
FIGURE 5 is a top plan view of a modification of this invention, in which three annular members are disposed between, and integral with, the parallel bars.

Referring more specifically to the drawings, FIGURE 1 shows a platform-type traction structure 10 comprising a pair of annular members 11, 11, integrally connected at 12 and having a pair of bars 13, 13 tangentially and integrally connected, in parallel relationship, to the opposing peripheries of the said annular members, at points 14 thereon, each point 14 being spaced 90 degrees from the juncture point 12 between said rings. At point 12 and at each of the four points 14 there are provided projecting elements 15 of such character and contour as to penetrate into a soft or powdery surface or other difficult terrain. Loops 16, formed upon and integral with the outermost and opposing portions of the said annular members, are of such size and so disposed as to permit interconnecting links to be attached, for assembly of the said structure onto and between a pair of conventional side chains.

In FIGURE 2, the said projecting elements 15 upon the annular members are disposed at spaced intervals upon the annular members, at points other than the junctures of said members and said bars.

In FIGURE 3 it will be noted that the loops 16 are so formed as to extend angularly from the plane of the bars of the structure, and the annular members are likewise tilted angularly from the plane of the bars so that the center projecting element will achieve deeper penetration of the terrain than the others of said elements. It has been found in operation that this construction eliminates a considerable amount of the breakage that has been encountered in similar structures wherein all members and bars were disposed in the same plane. For the same purpose, the structure may provide a longer projecting element at the center, to increase the penetrative action for improved traction.

While structures of a similar character have heretofore been used wherein the component parts were formed individually and welded together, it is now deemed desirable to provide such devices by casting, as of steel, each platform structure comprising annular members, parallel bars, and projecting elements and loops being a single casting, and suitable numbers of such castings being assembled flexibly, and independently of each other, to the side chains.

While the foregoing sets forth the preferred embodiments and means of operation according to my invention, it is understood that many modifications and variations will be immediately understood by those making use of my invention.

I claim:

1. In a traction assembly, multiple rigid, platform-type structures, each being formed integrally with a plurality of annular members disposed between parallel, elongated members, and having upon said structure projections extending in a direction transverse to the plane thereof as established by said elongated members; and upon the opposite and outermost arcs of said annular members and integral therewith, loops adapted to receive interconnecting means for attaching said platform-type structure to the side chains of said traction assembly.

2. An invention as claimed in claim 1, wherein said loops are disposed angularly in a direction obliquely away from the direction in which said projections extend.

3. An invention as claimed in claim 1, wherein said annular members are disposed in a relationship not coincident with the plane of the said elongated members, and such non-plane disposition of said annular members causes the inner and integrally joined peripheries thereof, and the projection formed thereat, to be aligned outwardly from the wheel upon which said assembly is mounted, in relation to the plane of said elongated members, and the outermost and opposing portions of said peripheries to be disposed inwardly toward the circumference of the wheel.

References Cited

UNITED STATES PATENTS

| | | | |
|---|---|---|---|
| 1,818,794 | 8/1931 | Drager | 152—229 |
| 2,545,887 | 3/1951 | Langenfeld | 152—229 |

ARTHUR L. LA POINT, *Primary Examiner.*

C. B. LYON, *Assistant Examiner.*